United States Patent Office 3,574,816
Patented Apr. 13, 1971

3,574,816
PROCESS FOR TREATING RICE HUSK
Ala El Dine Abbdellatif, 35 Rue du Mont-Valerien,
92 Saint Cloud, France
No Drawing. Filed Mar. 6, 1968, Ser. No. 710,766
Claims priority, application France, Apr. 28, 1967,
104,583
Int. Cl. B28b *3/00;* C04b *35/22*
U.S. Cl. 264—333                                18 Claims

ABSTRACT OF THE DISCLOSURE

Process for treating rice husk comprising roasting the rice husk during less than 60 seconds, in the presence of oxygen until the rice husk has lost 30–70% of its weight, mixing the rice husk as so obtained with at least 10% by weight of a water-soluble compound of calcium salts to form a mixture, moistening said mixture with an aqueous solution of an aluminum compound and, as a catalyst, piperidine, diphenylurea and aminoguanidine hydrochloride, whilst maintaining the pH of the mixture above 7, compacting the moistened mixture and, after aging the pressed product contacting it with water and then drying the moist product.

---

The present invention relates to a process for treating rice husk and to the material obtained by said process.

Rich husk constitutes a dangerous industrial waste product as a result of the danger of fire and silicosis (when handling rice husk ashes) and for many years no use was known for it.

Numerous attempts have been made to find uses for rice husk and one suggestion was to treat it to produce a construction material.

This process comprises mixing shells of calcinated rice grains and a cementing or binding material containing calcium with, if desired, very small proportions of other ingredients, moistening the mixture with water, moulding it under pressure into the desired form at room temperature, partially drying the moulded product, also at room temperature, soaking it in a diluted solution of an aluminum salt and thereafter drying the product at a temperature not exceeding 35° C.

However, the materials produced by this process are extremely crumbly and tend to disintegrate; they undergo cracking or lack adherence with the mortars and plasters used with them. Their crush strength is low and rarely reaches 50 kg./sq. cm.; they remain for the most part extremely porous and absorb very considerably quantities of water.

Moreover they are not easy to work and are easily reduced to a powder owing to the lack of cohesion of the agglomerates and the complete lack of chemical reactivity of the material obtained.

It is an object of the present invention to provide a process for preparing materials from rice husk which do not suffer the disadvantages of the material prepared by the known process and are of utility in particular:

As a heat and sound insulating materials, e.g. for the construction of cold storage rooms, as a heat and nuclear screens;

As refractory or semi-refractory products;

In the aeronautical field, e.g. for the construction of rocket nozzles and the space entering cones of vehicle to travel in space;

In the military field, for example as an armouring material;

In the construction of highways, for example, as an antiskid layer;

In all industrial fields, for example, as a base or foundation for machines, as a vibration absorber and generally for all uses in which its properties of cohesion, workability, insulation, low shrinkage and high elasticity are useful.

Broadly the present invention consists in a process for treating rice husk which comprises roasting the rice husk by a regulated supply of heat in the presence of from 0.02 to 0.10 cu. m. of oxygen per kilogram of rice husk until the latter has lost 30 to 70% of its weight, mixing the rice husk ash so obtained with at least one water-soluble compound of alkali-earth metals to form a mixture, moistening said mixture with an aqueous solution containing at least 0.04% and preferably more than 0.07% by weight of an aluminum compound and containing an organic base containing nitrogen, whilst maintaining the pH of the mixture above 7, compacting the moistened mixture at a pressure greater than 30 kg./sq. cm. (and preferably at a pressure between about 120 and 300 kg./sq. cm.), and after aging the pressed product, contacting it with water and then drying the moist product.

Further features and advantages of the invention will be apparent from the following description.

The first stage of the process according to the invention is a slight roasting of the rice husk which must be carried out under the following conditions:

The loss of weight undergone by the starting material introduced in the roasting oven must be between 30 and 70% and preferably between about 40 and 60%.

A more severe calcination or roasting, for example that resulting in a loss of weight greater than 70%, converts the organic siliceous material of the rice husk into a mineral silica which is unreactive and useless. Too moderate roasting, resulting in a loss in weight of less than 30%, yields an ash consisting of a mixture of a carbonaceous material and amorphous silica of no practical interest.

However, when the rice husk is roasted to a loss of weight of from 30 to 70%, preferably from 40 to 60%, the siliceous material transforms into reactive organic derivatives of silicon, the presence of which is necessary for the remainder of the process.

To ensure that this conversion takes place, it is necessary that the amount of heat supplied to the rice husk be regulated between certain limits and that the amount of oxygen admitted to the roasting oven be from 0.02 to 0.10 cu. m. per kilogram of rice husk.

The supply of heat can be regulated by regulation of the roasting temperature and of the time during which the rice husk remains in the oven.

Satisfactory results are obtained by heating the rice husk to a temperature of from 250° C. to 1,000° C., suitably for a period of less than 60 seconds. In general, the shorter the period of time for which the husk is roasted, the higher must be the temperature.

Preferably, the rice husk is roasted at a temperature of from 600 to 800° C. and suitably for a period of from 30–60 seconds. Thus, for example, at 600° C., roasting for from 60 seconds results in a 50–60% loss of weight; at 800° C., roasting for 30 seconds results in a 67% loss of weight.

As mentioned previously, in order to ensure conversion of the starting material into the ash containing reactive organic derivatives of silicon, it is also necessary to carefully regulate the volume of oxygen admitted into the roasting oven only allowing from 0.02 to 0.10 cu. m. and preferably from 0.30 to 0.07 cu. m. per kilogram of rice husk. It will be understood that the oxygen can be supplied as such or in the form of a gas containing oxygen, e.g. air. For example, 0.10 to 0.40 cu. m. (preferably 0.15 to 0.30 cu. m.) of air per kilogram of rice husk may be used.

The rice husk ashes obtained at the end of the first stage are then treated in a second stage by mixing the ashes with an alkali-earth metal derivative and then moistening the mass obtained with a solution comprising an aluminium compound and a catalyst.

As an alkali-earth metal derivative, which probably acts as an ionic exchange agent, water-soluble derivatives of alkali-earth metals or mixtures thereof are of utility. There is for example employed calcium carbonate, barium carbonate, hydrated or unhydrated oxides of these metals, etc. . . . or a mixture of these derivatives are for example employed. Slaked lime, Ca(OH)$_2$, is preferably employed.

The weight of calcium (or for another alkali-earth metal), calculated as the hydroxide, preferably represents at least 10% of the weight of the rice husk ash and is advantageously from 20% to 100%.

These percentages have an effect on the density of the material finally obtained, the density being higher as the amount of material foreign to rice husk ash increases. The densities of the final products range from 0.4 to 2.2 g./cc.

After having well mixed the mass of ashes and alkali-earth metal derivative, the mass is moistened by means of an aqueous solution (I) containing an aluminum compound and an organic base containing nitrogen.

As the aluminum compound, which acts as a floculating agent, there may be employed any aluminum salt, even of commercial quality, such as aluminum sulfate, aluminum chloride, alumina or a mixture of these aluminum derivatives.

The solution (I) must contain at least about 0.04% and preferably more than about 0.07% of the aluminum floculation agent calculated as aluminum metal.

In a preferred embodiment of the invention, the said organic base containing nitrogen comprise a mixture of one part of piperidine, two parts of diphénylurea, three parts of aminoguanidine hydrochloride and eight parts of manganesium chloride by weight.

The catalytic composition represents 0.05–5%, and preferably 0.07–0.5%, of the weight of the elementary aluminum contained in the solution (I).

The mass formed by the mixture of ashes and alkali-earth metal derivative may be moistened with from 10 to 60%, and preferably from 20 to 50%, by weight, of the solution (I).

Optionally and advantageously, there can be added to the mass of ashes and alkali-earth metal derivative a filler such as portland cement, laterite, clay, sand, gravel, and/or a colouring agent or any other conventional material for imparting some particular property to the final product.

However, it must be stressed that these are mere possibilities and that, in particular, the addition of cement is not necessary for carrying out the process of the invention.

The quantity of these fillers or other additives which can be added to the mass is unlimited. However, to obtain a material having essentially the characteristics due to the roasted rice husk, it is preferred that the fillers do not exceed 50% of the total weight of the mass and the fillers are preferably added in an amount of from 10 to 20% by weight. It is also desirable to add to the solution (I) before using it certain other ingredients, such as sodium tetraborate (borax), which facilitate the migration of the ions and their re-arrangement, and a hardening agent, such as calcium chloride, which results in a harder and quicker setting.

In the course of this second stage it is essential that the pH of the mixture remains constantly above 7.

It will be noted that the addition of slaked lime or alkali-earth metal hydroxide as the alkali-earth metal derivative, can suffice to ensure that this condition is respected. But if a neutral or acid salt is added instead of slaked lime, the alkalinity of the mixture should be maintained by adding, for example, ammonia or another appropriate base.

A mixture is thus obtained which is ready for the third stage of the process of the invention.

This third stage of putting into shape after the moistening stage is carried out in such manner that the time which elapses between these two stages does not exceed the time necessary for the evaporation of from 10 to 15% of the solution (I) in the mixture. If a higher evaporation occurred it would be well to once more moisten the mixture with water.

The mixture is rapidly put into shape, for example in a press in the cold state under a pressure exceeding 30 kg./sq. cm. and preferably from 120 to 300 kg./sq. cm.

A moist powdery product is thus obtained which has a volume which is only a fraction, for example of about ¾, of the volume of the initial mixture.

The product so formed is then allowed to age preferably for between 8 to 30 hours, depending on the humidity of the locale and this is the fourth stage of the process of the invention.

This aging consolidates the physical structure of the shaped product and enables it to undergo the subsequent water treatment without disintegration.

Thereafter, the product is contacted with water, for example by immersion in a bath or by spraying, preferably for between 8 to 12 hours. This water treatment puts the chemical constituents and of the mixture, and, in particular, the catalytic constituents, back into action so as to ensure that a heterosilicate type structure of aluminum and alkali-earth metal is obtained. Each time that the product is subsequently remoistened, for example owing to weather conditions, the same reactions will recur and the product will become still more solid.

The product is then removed from the water, allowed to dry, for example in free air, and is then ready for use.

By varying the loss in weight by roasting, the degree of moistening, the proportions of the final mixture, or the pressure employed in the third stage, products having different mechanical and insulating characteristics are obtained.

Although the applicant does not intend to limit the invention by a particular theory, it is probable that the final product consists of an organic silica in which the silicon atom is connected by each of its four valences so as to form organo-silicic long chains having a certain chemical reactivity.

The effect of the organic base containing nitrogen is to convert the reactive organic derivative of silicon into a colloidal gel capable of flocculating with other elements.

After combustion, the rice shells have a very special microscopic structure. They are crossed throughout by micro-channels the number of which is very high. This has for effect to increase considerably the surfaces of contact of the product, whence the increase in the reactivity and the penetration of the catalytic solutions to the very middle of the product, which promotes homogeneous chemical reactions throughout the mass.

The materials thus obtained have very high elasticity and do not shrink. They are incombustible and can withstand temperatures up to 700° C. before collapsing under a force of 20 g./sq. cm. exerted by a buffer. The heat and sound insulation is high. Frost has no effect on these materials and they do not exhibit cracking. Liquid air does not deteriorate them in any way. They absorb vibrations and shocks owing to their elasticity and are consequently of considerable use for buildings in areas which are earthquake-prone. They can be machined or worked extremely well without being friable and have the characteristics of a good-quality hard wood. They can be nailed, sawn, riveted, screwed, drilled. Paints and other coatings adhere perfectly well to their surface. As the material is some-what alkaline it is not attacked by harmful insects and termites.

The following examples are given merely to illustrate the invention:

EXAMPLE 1

Rice husk is roasted in an appropriate oven at 600° C. for 50 seconds with an admission of 0.25 cu. m. of air (under normal conditions) per kilogram of rice husk. The latter yields an ash in undergoing a loss of weight of about 60%. One part by weight of this ash is intimately mixed with one part by weight of slaked lime. The mass obtained is moistened with 30% by weight of an aqueous solution prepared in the following manner:

| For 100 litres of water— | G. |
|---|---|
| Aluminum sulfate | 500 |
| Sodium tetraborate (borax) | 2 |
| Calcium chloride | 1.5 |
| Aminoguanidine hydrochloride | 0.75 |
| Diphenylurea | 0.50 |
| Piperidine | 0.25 |
| Magnesium chloride | 2 |

The whole is well mixed, the pH being maintained above 7 so as to achieve a perfect distribution of the solution in the mass. In this way a moist powdery product is obtained which, when pressed in the hand, gives the impression of dampnes without liquid running out. The product thus obtained is put into moulds and pressed at 200 kg./sq. cm. in hydropenumatic or mechanical presses. This pressure of 200 kg./sq. cm. reduces the initial volume by ¾. The blocks thus formed are stripped from the moulds and allowed to age for 12 hours. The blocks are thereafter immersed for 10 hours in water, which causes a crystallization, and then withdrawn from the water and allowed to dry in free air. The blocks remain reactive and each time they receive moisture the crystallization recurs in the mass. The blocks obtained have a density of 0.1 and a crush strength of 100 kg./sq. cm.

EXAMPLE 2

Example 1 is repeated except that 10% of portland cement is added to the mass formed of one part ash and one part slaked lime.

The final product obtained has a crush strength of 120 kg./sq. cm. and a density of 1.1.

EXAMPLE 3

The rice husk is roasted in an appropriate oven at 800° C. for 20 seconds with an admission of 0.20 cu. m. of air (under normal conditions) per kilogram of rice husk. Three parts by weight of calcium chloride and 0.7 part of laterite or clay are added to four parts of ash. The mass thus obtained is moistened with 45% by weight of a solution prepared in the following manner:

| For 100 litres of water— | G. |
|---|---|
| Aluminum chloride | 400 |
| Borax | 4 |
| Calcium chloride | 1 |
| Aminoguanidine hydrochloride | 1 |
| Diphenylurea (carbamide) | 2 |
| Piperidine | 0.10 |

The pH of the mixture is always higher than 7.

Immediately after the moistening stage the mixture is introduced into an extruder where it is subjected to a pressure of 150 kg./sq. cm.

At the output end of the extruding die the product is cut to the desired dimensions. It is dried in free air for 18 hours, immersed in a tank of water for 8 hours and allowed to dry in air.

A product having a density of 0.9 and a crush strength of 60 kg./sq. cm. is obtained.

EXAMPLE 4

The Example 3 is repeated except that 2 parts by weight of rice husk ash as prepared in Example 3 is mixed with one part by weight of laterite and 0.3 part of slaked lime. A product having a density of 1.4 and a crush strength of 65 kg./sq. cm. is obtained.

Although specific examples of carrying out the invention have been described, it must be understood that the invention is not intended to be limited thereto but is defined in the accompanying claims.

Having now described my invention what I claim as new and desire to secure by Letters Patent is:

1. A process for treating rice husk comprising:
   roasting said rice husk between 250 and 1000° C. during less than 60 seconds, in the presence of an amount from 0.02 to 0.10 cu. m. of oxygen per kilogram of rice husk until said rice husk has lost from 30 to 70% of its weight, to obtain rice husk ash,
   mixing the rice husk ash so obtained with at least 10% by weight of a water-soluble compound of calcium (calculated in its hydroxide form) to form a mixture,
   moistening said mixture with an aqueous solution containing at least 0.04% by weight calculated as aluminum metal) of an aluminum compound and, as a catalyst, piperidine, diphenyl urea and aminoguanidine hydrochloride whilst maintaining the pH of the mixture above 7,
   compacting the moistened mixture to a pressure greater than 30 kg.üsq. cm., and, after aging the pressed product, contacting it with water and then drying the moist product.

2. A process as claimed in claim 1, wherein the aluminum content of said aqueous solution is greater than 0.07%.

3. A process as claimed in claim 1 comprising roasting said rice husk until it has lost from 40 to 60% of its weight.

4. A process as claimed in claim 1, wherein said roasting is carried out at a temperature between 600 and 800° C.

5. A process as claimed in claim 1, wherein the rice husk is roasted for a period of about 20–50 seconds.

6. A process as claimed in claim 1, wherein said oxygen is introduced in the form of air.

7. A process as claimed in claim 1, wherein the calcium compound is mixed in an amount of from 20 to 100% of the rice husk ash.

8. A process as claimed in claim 1 wherein said aluminum compound is selected from the group consisting of aluminum sulfate and aluminum chloride.

9. A process as claimed in claim 1, wherein the catalyst represents 0.05–5% of the weight of the metallic aluminum contained in the moistening solution.

10. A process as claimed in claim 1, wherein the catalyst represents 0.07–0.5% of the weight of the metallic aluminum contained in the moistening solution.

11. A process as claimed in claim 1, wherein the mixture is moistened with 10–60% by weight of the moistening solution.

12. A process as claimed in claim 1, wherein the mixture is moistened with 20–50% by weight of the moistening solution.

13. A process as claimed in claim 1, wherein the moistened mixture is compacted before 10–15% by weight of the moisture contained in said mixture has evaporated.

14. A process as claimed in claim 1, wherein the moistened mixture is compacted in a press.

15. A process as claimed in claim 1, wherein the moistened mixture is compacted in an extruder.

16. A process as claimed in claim 1, wherein the compacting is carried out under a pressure of from 120 to 300 kg./sq. cm.

17. A process as claimed in claim 1, wherein the pressed product is allowed to age for from 8 to 30 hours.

18. A process as claimed in claim 1, wherein the pressed product is contacted with water for from 8 to 12 hours.

References Cited

UNITED STATES PATENTS 2,720,462  10/1955  Jones ---------------- 106—69

FOREIGN PATENTS

| 519,243 | 8/1947 | Great Britain | 106—69 |
| 697,474 | 9/1953 | Great Britain | 106—69 |
| 756,689 | 9/1956 | Great Britain | 106—69 |

ROBERT F. WHITE, Primary Examiner

G. ALUVILLE, Assistant Examiner

U.S. Cl. X.R.

106—63 120; 264—236, 333

UNITED STATES PATENT OFFICE
CERTIFICATE OF CORRECTION

Patent No. 3,574,816          Dated April 13, 1971

Inventor(s) Ala El Dine Abbdellatif

It is certified that error appears in the above-identified patent and that said Letters Patent are hereby corrected as shown below:

COLUMN 1
Line 52, change "considerably" to --considerable--.
Line 60, after "particular:" insert --as building materials, e.g. bric
         hollow brickwork and partition walls;--.

COLUMN 2
Line 69, change "0.30" to --0.03--.
COLUMN 3
Line 6, change "aluminium" to --aluminic--.
Line 16, after "(or)" change "for" to --of--.
Line 38, after "nitrogen" change "comprise" to --comprises--.
Line 41, change "manganesium" to --magnesium--.
Line 47, after "preferably" change "from" to --about--.

COLUMN 5
Line 29, after "of" change "dampnes" to --dampness--.

COLUMN 6
Claim 1, line 28, after "weight" insert --(--.
Claim 1, line 34, after "30" delete "kg.üsg.cm.," and insert therefor
         --kg./sq.cm.,--.
Claim 2, line 37, change "aluminum" to --aluminic--.

Signed and sealed this 7th day of December 1971.

(SEAL)
Attest:

EDWARD M.FLETCHER,JR.      ROBERT GOTTSCHALK
Attesting Officer              Acting Commissioner of Patents